March 6, 1962 G. BAKOS 3,023,942
APPARATUS FOR RECORDING AND REPRODUCING SIGNALS
Filed May 8, 1958
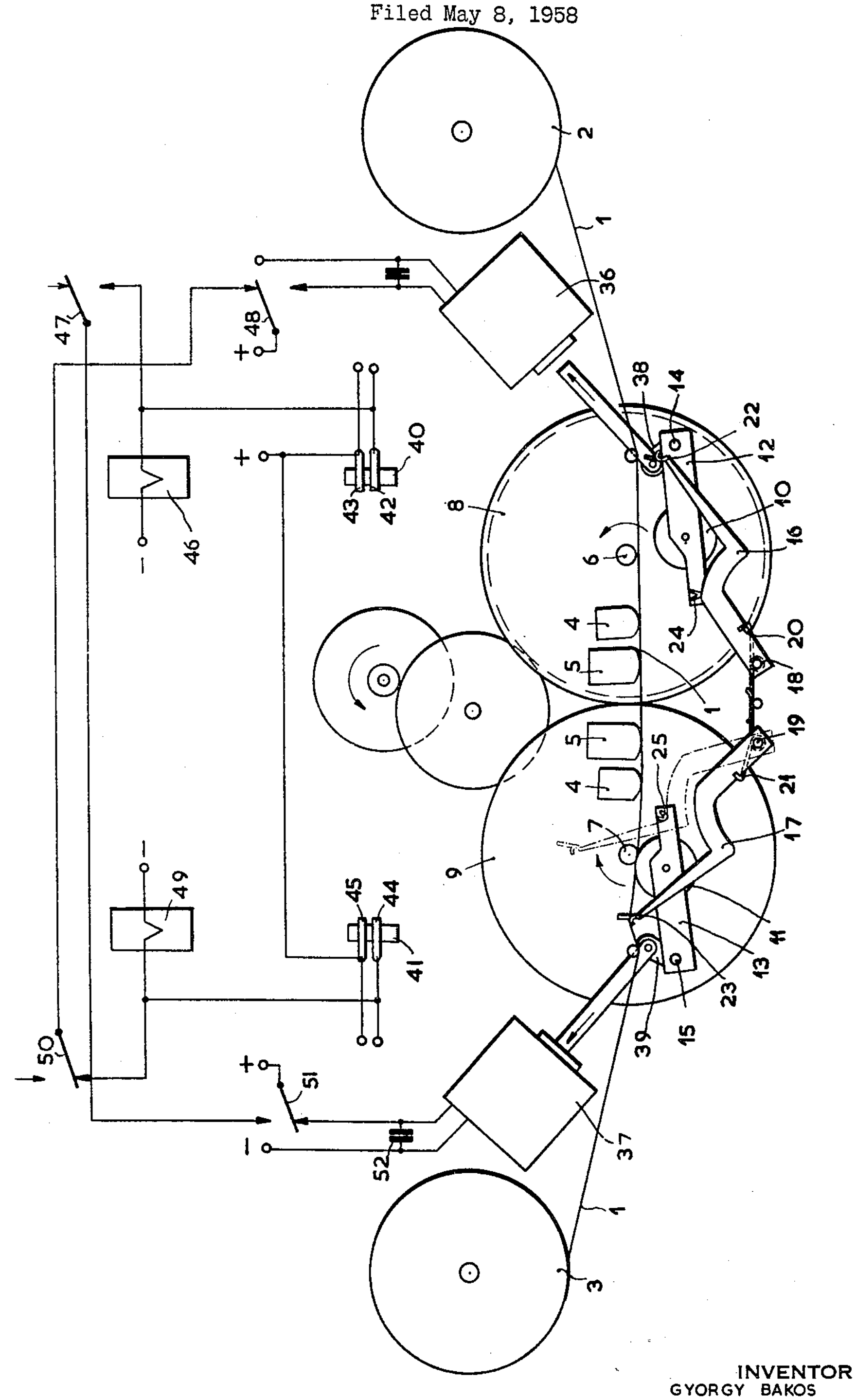
INVENTOR
GYORGY BAKOS
BY Frank R. Jeifari
AGENT

United States Patent Office 3,023,942

Patented Mar. 6, 1962

3,023,942

APPARATUS FOR RECORDING AND REPRODUCING SIGNALS

Gyorgy Bakos, Eindhoven, Netherlands, assignor to North American Philips Company, Inc., New York, N.Y., a corporation of Delaware Filed May 8, 1958, Ser. No. 733,911
Claims priority, application Netherlands May 23, 1957
5 Claims. (Cl. 226—50)

The present invention relates to an arrangement for recording or reproducing recordings in the form of a number of tracks on a tape in the direction of length thereof. More particularly, the invention relates to such an arrangement in which the tape can be moved during recording or reproduction by means of two driving rollers which are continuously driven in opposite senses, means being provided which enable the tape to be urged to one of the driving rollers by means of a pressure roller.

An arrangement of the kind described is known for recording or scanning photo-sensitive sound recordings. Obviously, such an arrangement can also be used for recording or scanning magnetic recordings, for example image recordings.

In the known arrangement, the direction of movement of the tape can be reversed without the direction of movement of the drive being reversed. All that is required is to brake the masses of the tape and at least one of the reels on which the tape is wound and to drive them in the opposite sense. Thus, changing over can be effected in a short period of time.

This known arrangement has a limitation in that the initial take-up reel, which subsequently is the take-off reel and may have a large mass inertia, must likewise change its direction of rotation in the shortest possible time, since otherwise the tape is likely either to slip in relation to the driving shaft or to break. Furthermore, the initial take-off reel, which after changing over has become the take-up reel, must reverse its direction of rotation in the shortest possible time in order to prevent loop formation as far as possible.

It is an object of the present invention to provide steps by means of which the time for changing over the sense of rotation of the reels can be extended without prolonging the time required to reverse the direction of movement of the part of the tape which is scanned or recorded.

According to the invention, provision is made between each driving roller and the associated take-up reel of a movable member which can be urged resiliently to the tape so that during changing over from one driving roller to the other the loop in the tape between the operative driving roller and the associated take-up reel can be taken up. Thus, the members ensure the formation of loops between the reels and the driving rollers so that there is play between a driving roller and the associated take-off reel, loops occurring between a driving roller and an associated take-up reel being taken up by the member. This arrangement permits of changing over, both during recording and during scanning, from one track to another substantially uninterruptedly.

According to a further feature of the invention, coupling is provided between each pressure roller and the associated member so that during changing over, owing to the application of a pressure roller to the associated driving roller, the member is enabled to engage the tape resiliently.

This ensures that during changing over a loop produced by a new driving roller being rendered operative is taken up as soon as the associated pressure roller is moved towards the new driving roller.

According to still another feature of the invention, decoupling of a pressure roller and the associated driving roller also results in the member being raised.

Thus, the loop produced by this member becomes completely available as play between the new driving roller and the associated take-off reel. In addition, the insertion of the tape with decoupled pressure rollers is simplified.

In order to impart a sufficient degree of freedom to the member, there is a certain free movement between the movement for decoupling the pressure roller and the associated member.

In order that the invention may readily be carried out, one embodiment thereof will now be described, by way of example, with reference to the accompanying drawing, the single FIGURE of which is a plan view of an arrangement for recording and scanning magnetic recordings. In the figure, during recording and scanning, a tape 1 can be moved from a reel 2 onto a reel 3 and vice versa at will. Recordings on the tape 1 are recorded and scanned by means of heads 4 which are suitable both for recording and scanning. Between these heads, provision is made of erasing heads 5. The tape is driven by means of smooth rollers 6 or 7 respectively, which are each provided with a flywheel 8 and 9 respectively. The tape 1 can be urged to the associated driving roller by means of pressure rollers 10 and 11 respectively. The pressure rollers 10 and 11 are displaceable in that they are mounted on arms 12 and 13 respectively, which can be pivoted relatively to the arrangement about 14 and 15 respectively. Provision is also made of members 16, 17 shaped in the form of arms which are pivotally mounted in relation to the arrangement by pivots 18, 19. Each arm is provided with a spring 20, 21, by which the ends 22, 23 of the arms 16, 17 can be moved towards the tape 1. In the condition shown, the end 23 engages the tape 1 so that a loop is produced between the driving roller 7 and the reel 3. The arm 12 retains the arm 16 so that the end 22 of the latter arm is spaced away from the tape 1. To this end, the arms 12 and 13 are provided with stops 24 and 25. During changing over, the following cycle is performed. The arm 12 is moved clockwise by a control device until the tape 1 is clamped between the driving roller 6 and the pressure roller 10. Thus, arm 16 is enabled to move counter clockwise under the action of the spring 20 so that the end 22 resiliently engages the tape 1. At the same instant, the arm 13 is moved clockwise and during this movement, at least during the last part thereof, drives the arm 17 by means of the stop 25. Hence, the loop produced by the end 23 becomes completely available as play. Consequently, the driving roller 6 is enabled to drive the tape 1 from the left to the right immediately owing to the loop which is released by the end 23. Due to the new direction of movement, a new loop will be produced between the driving roller 6 and the reel 2, but this loop is taken up by the end 22. Only when the loop released by the end 23 has been completely used the reel 3 must have reversed its direction of rotation completely. The same applies to the reel 2 when the maximum loop has been taken up by the end 22. As is shown by broken lines for the arm 17, the maximum deflection of the ends 22 and 23 is made large so that the maximum amount of time is available for reversing the direction of rotation of the reels.

The arms 12 and 13 are controlled by electromagnets 36 and 37 by means of levers 38 and 39. The electromagnets 36 and 37 are connected in an electrical circuit, the magnet 37 which may be commercially available single acting spring loaded, or double acting, electromagnets, being energized in the condition shown. Rings 42, 43 and 44, 45, past which the tape 1 is moved, are arranged on stationary guiding pins 40 and 41 respectively so as to be insulated from one another. A conductive strip on the tape (not shown) electrically connects the rings 42 and 43 to each other in the position shown of the arrangement, in which the tape is driven from the right to the left. Hence a relay 46 is energized so that switches 47 and 48 are switched over. Consequently a relay 49 is deenergized so that switches 50 and 51 are also switched over. Thus, the magnet 37 is capable of holding the pressure roller 11 to the driving roller 7 for some time with the aid of capacitor 52. This capacitor 52 is chosen so that the contact between the pressure roller 11 and the driving roller 7 is interrupted at the instant at which the pressure roller 10 urges the tape 1 to the driving roller 6. When the direction of movement of the tape 1 is opposite to the direction shown in the figure, the above-described change-over is effected in the opposite sense in that the insulated rings 44 and 45 are electrically connected to each other.

What is claimed is:

1. Apparatus for recording and reproducing signals on an elongated recording medium in the direction of length thereof, said medium being adapted to move between first and second reels, comprising means for recording and reproducing signals on said medium, first and second driving rollers for said medium positioned in spaced relation from each other, said driving rollers being continuously rotated in opposite directions, a first pressure roller positioned in operative relation to said first driving roller and said medium, a first movable member supporting said first pressure roller, a second pressure roller positioned in operative relation to said second driving roller and said medium, a second movable member supporting said second pressure roller, control means for moving one of said first and second pressure rollers into engagement with said medium to urge the said medium into engagement with its associated driving roller in accordance with the desired direction of movement of the said medium, a first movable arm positioned between said first reel and said first driving roller, means normally urging said first arm toward said medium to form a loop therein, said first arm being movable away from the said medium to substantially remove said loop, a second movable arm positioned between said second reel and said second driving roller, means normally urging said second arm toward said medium to form a loop therein, said second arm being movable away from the said medium to substantially remove said loop, means responsive to movement of said first member for moving the said first arm away from said medium upon said control means moving the said first member to move said first pressure roller out of engagement with the said medium, and means responsive to movement of said second member for moving the said second arm away from said medium upon said control means moving the said second member to move said second pressure roller out of engagement with the said medium.

2. Apparatus for recording and reproducing signals on an elongated recording medium in the direction of length thereof, said medium being adapted to move between first and second reels, comprising means for recording and reproducing signals on said medium, first and second driving rollers for said medium positioned in spaced relation from each other, said driving rollers being continuously rotated in opposite directions, a first pressure roller positioned in operative relation to said first driving roller and said medium, a first movable member supporting said first pressure roller, a second pressure roller positioned in operative relation to said second driving roller and said medium, a second movable member supporting said second pressure roller, control means for moving one of said first and second pressure rollers into engagement with said medium to urge the said medium into engagement with its associated driving roller in accordance with the desired direction of movement of the said medium, a first movable arm positioned between said first reel and said first driving roller, spring means normally urging said first arm toward said medium to form a loop therein, said first arm being movable away from the said medium to substantially remove said loop, a second movable arm positioned between said second reel and said second driving roller, spring means normally urging said second arm toward said medium to form a loop therein, said second arm being movable away from the said medium to substantially remove said loop, means mounted on said first member for moving the said first arm away from said medium upon said control means moving the said first member to move said first pressure roller out of engagement with the said medium, and means mounted on said second member for moving the said second arm away from said medium upon said control means moving the said second member to move said second pressure roller out of engagement with the said medium.

3. Apparatus for recording and reproducing signals on an elongated recording medium in the direction of length thereof, said medium being adapted to move between first and second reels, comprising means for recording and reproducing signals on said medium, first and second driving rollers for said medium positioned in spaced relation from each other, said driving rollers being continuously rotated in opposite directions, a first pressure roller positioned in operative relation to said first driving roller and said medium, a first movable member supporting said first pressure roller, a second pressure roller positioned in operative relation to said second driving roller and said medium, a second movable member supporting said second pressure roller, control means for moving one of said first and second pressure rollers into engagement with said medium to urge the said medium into engagement with its associated driving roller in accordance with the desired direction of movement of the said medium, said control means comprising first electromagnetic means for moving said first member, second electromagnetic means for moving said second member, means actuated by said medium for energizing said first electromagnetic means when the said medium moves in one direction and means actuated by said medium for energizing said second electromagnetic means when the said medium moves in the other direction, a first movable arm positioned between said first reel and said first driving roller, means normally urging said first arm toward said medium to form a loop therein, said first arm being movable away from the said medium to substantially remove said loop, a second movable arm positioned between said second reel and said second driving roller, means normally urging said second arm toward said medium to form a loop therein, said second arm being movable away from the said medium to substantially remove said loop, means responsive to movement of said first member for moving the said first arm away from said medium upon said control means moving the said first member to move said first pressure roller out of engagement with the said medium, and means responsive to movement of said second member for moving the said second arm away from said medium upon said control means moving the said second member to move said second pressure roller out of engagement with the said medium.

4. Apparatus for recording and reproducing signals on an elongated recording medium in the direction of length thereof, said medium having a conductive strip thereon and being adapted to move between first and second reels, comprising means for recording and reproducing signals on said medium, first and second driving rollers for said medium positioned in spaced relation from each other, said driving rollers being continuously rotated in opposite directions, a first pressure roller positioned in operative relation to said first driving roller and said medium, a first movable member supporting said first pressure roller, a second pressure roller positioned in operative relation to said second driving roller and said medium, a second movable member supporting said second pressure roller, control means for moving one of said first and second pressure rollers into engagement with said medium to urge the said medium into engagement with its associated driving roller in accordance with the desired direction of movement of the said medium, said control means comprising first electromagnetic means for moving said first member, second electromagnetic means for moving said second member, means for energizing said first electromagnetic means, first switching means comprising a pair of contacts supported on insulating rings, means positioning said first switching means in said first-mentioned energizing means in a manner whereby said conductive strip closes said contacts to energize said first electromagnetic means when the said medium moves in one direction, means for energizing said second electromagnetic means, second switching means comprising a pair of contacts supported on insulating rings and means positioning said second switching means in said last-mentioned energizing means in a manner whereby said conductive strip closes said last-mentioned contacts to energize said second electromagnetic means when the said medium moves in the other direction, a first movable arm positioned between said first reel and said first driving roller, means normally urging said first arm toward said medium to form a loop therein, said first arm being movable away from the said medium to substantially remove said loop, a second movable arm positioned between said second reel and said second driving roller, means normally urging said second arm toward said medium to form a loop therein, said second arm being movable away from the said medium to substantially remove said loop, means responsive to movement of said first member for moving the said first arm away from said medium upon said control means moving the said first member to move said first pressure roller out of engagement with the said medium, and means responsive to movement of said second member for moving the said second arm away from said medium upon said control means moving the said second member to move said second pressure roller out of engagement with the said medium.

5. Apparatus for recording and reproducing signals on an elongated recording medium in the direction of length thereof, said medium being adapted to move between first and second reels, comprising means for recording and reproducing signals on said medium, first and second driving rollers for said medium positioned in spaced relation from each other, said driving rollers being continuously rotated in opposite directions, a first pressure roller positioned in operative relation to said first driving roller and said medium, a first movable member supporting said first pressure roller, a second pressure roller positioned in operative relation to said second driving roller and said medium, a second movable member supporting said second pressure roller, control means for moving one of said first and second pressure rollers into engagement with said medium to urge the said medium into engagement with its associated driving roller in accordance with the desired direction of movement of the said medium, said control means comprising first electromagnetic means for moving said first member, second electromagnetic means for moving said second member, means actuated by said medium for energizing said first electromagnetic means when the said medium moves in one direction, means actuated by said medium for energizing said second electromagnetic means when the said medium moves in the other direction and capacitive means connected in each of said first and second electromagnet energizing means in a manner whereby each of said first and second pressure rollers remains in engagement with the said medium for a predetermined time when so engaged, a first movable arm positioned between said first reel and said first driving roller, means normally urging said first arm toward said medium to form a loop therein, said first arm being movable away from the said medium to substantially remove said loop, a second movable arm positioned between said second reel and said second driving roller, means normally urging said second arm toward said medium to form a loop therein, said second arm being movable away from the said medium to substantially remove said loop, means responsive to movement of said first member for moving the said first arm away from said medium upon said control means moving the said first member to move said first pressure roller out of engagement with the said medium, and means responsive to movement of said second member for moving the said second arm away from said medium upon said control means moving the said second member to move said second pressure roller out of engagement with the said medium.

References Cited in the file of this patent

UNITED STATES PATENTS

| | | |
|---|---|---|
| 2,687,884 | Ward et al. | Aug. 31, 1954 |
| 2,732,144 | Jones | Jan. 24, 1956 |
| 2,792,217 | Weidenhammer et al. | May 14, 1957 |
| 2,833,538 | Namenyi-Katz | May 6, 1958 |
| 2,893,653 | Schultheis et al. | July 7, 1959 |
| 2,943,852 | Quirk | July 5, 1960 |